United States Patent
Neubauer et al.

(10) Patent No.: US 7,137,311 B1
(45) Date of Patent: Nov. 21, 2006

(54) GEARBOX

(75) Inventors: Dirk Neubauer, Nachrodt-Wiblingwerde (DE); Dirk Heintzen, Hagen (DE); Detlef Axmacher, Iserlohn (DE)

(73) Assignee: AFT Atlas Fahrzeugtecknik GmbH, Werdohl (DE)

( * ) Notice: Subject to any disclaimer, the term of this patent is extended or adjusted under 35 U.S.C. 154(b) by 0 days.

(21) Appl. No.: 09/218,761

(22) Filed: Dec. 22, 1998

(30) Foreign Application Priority Data

Dec. 23, 1997 (DE) .......................... 197 57 471

(51) Int. Cl.
- *F16H 59/00* (2006.01)
- *F16H 61/00* (2006.01)
- *F16H 63/00* (2006.01)
- *B60K 17/04* (2006.01)

(52) U.S. Cl. ..................... 74/335; 74/473.12
(58) Field of Classification Search ............... 74/335, 74/473.12, 473.13, 473.1, 473.25, 473.26
See application file for complete search history.

(56) References Cited

U.S. PATENT DOCUMENTS

| | | | | |
|---|---|---|---|---|
| 4,428,248 A | * | 1/1984 | Broucksou et al. | 74/335 |
| 4,619,151 A | * | 10/1986 | Trachman et al. | 74/335 |
| 5,150,629 A | * | 9/1992 | Morris et al. | 74/337.5 |
| 5,357,822 A | * | 10/1994 | Lanting et al. | 74/473.1 |
| 5,706,712 A | * | 1/1998 | Tischer et al. | 91/173 |
| 5,916,326 A | * | 6/1999 | Tischer | 74/335 |
| 5,967,939 A | * | 10/1999 | Reik et al. | 477/77 |
| 5,997,432 A | * | 12/1999 | Neubauer et al. | 477/88 |
| 6,003,395 A | * | 12/1999 | Rogg et al. | 74/335 |
| 6,047,799 A | * | 4/2000 | Ahnert et al. | 192/3.56 |
| 6,116,391 A | * | 9/2000 | Kremmling et al. | 192/3.58 |
| 6,321,612 B1 | * | 11/2001 | Leimbach et al. | 74/335 |

FOREIGN PATENT DOCUMENTS

| | | |
|---|---|---|
| DE | 19637001 | 3/1997 |
| EP | 0301724 | 2/1989 |
| FR | 1406240 | 7/1965 |
| FR | 1409558 | 8/1965 |
| GB | 1076315 | 7/1967 |
| GB | 1081707 | 8/1967 |

* cited by examiner

*Primary Examiner*—Tisha D Lewis
(74) *Attorney, Agent, or Firm*—Darby & Darby

(57) ABSTRACT

A gearbox with an actuating device for automated shifting and selection of transmission ratios includes a gearbox operating element that is driven by an actuator. The actuator has a drive source with an output element. A swivel movement of the output element causes the gearbox operating element to shift into or out of a transmission ratio or to select one of the shift slots of a shift-gate pattern and to simultaneously apply a force to an energy-storing device. The energy-storing device acts on an intermediate element which acts on the gearbox operating element. At least one retaining element limits the actuation of the intermediate element to a predetermined position.

10 Claims, 9 Drawing Sheets

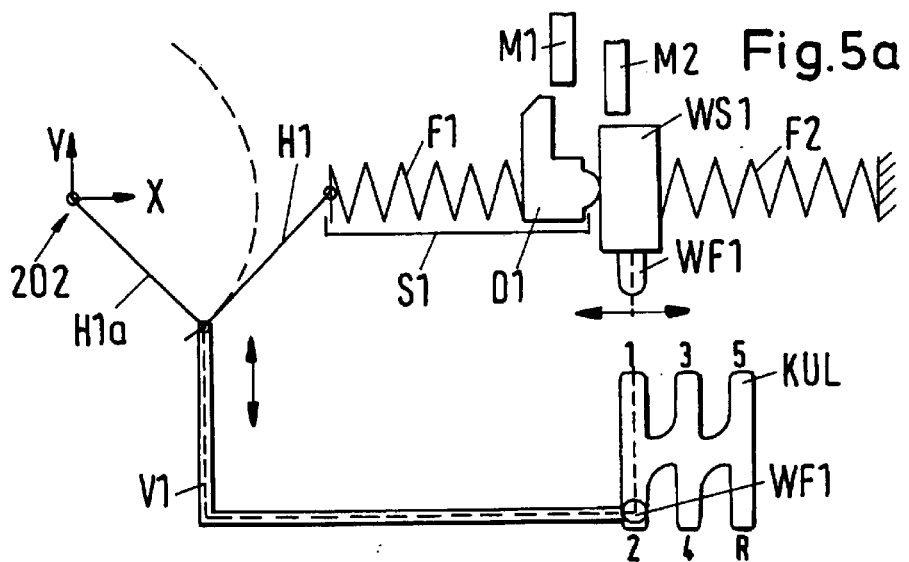
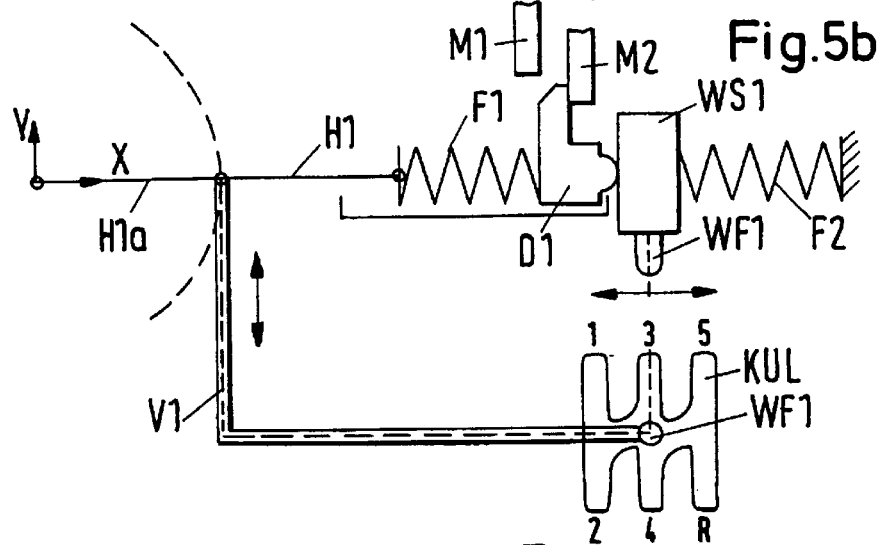
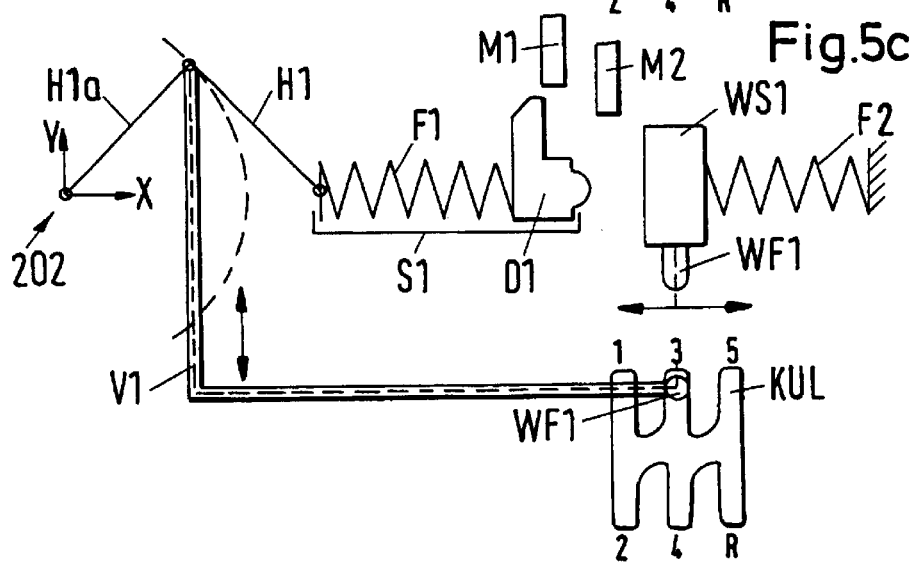

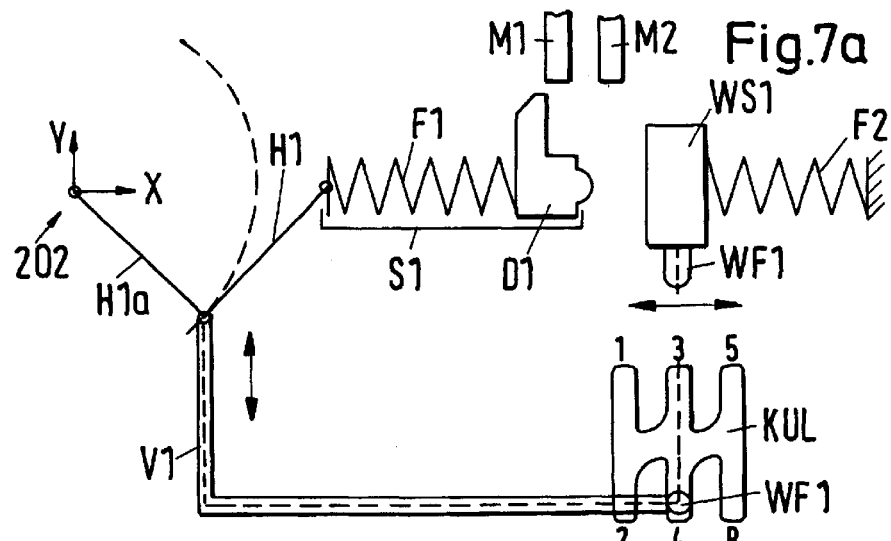
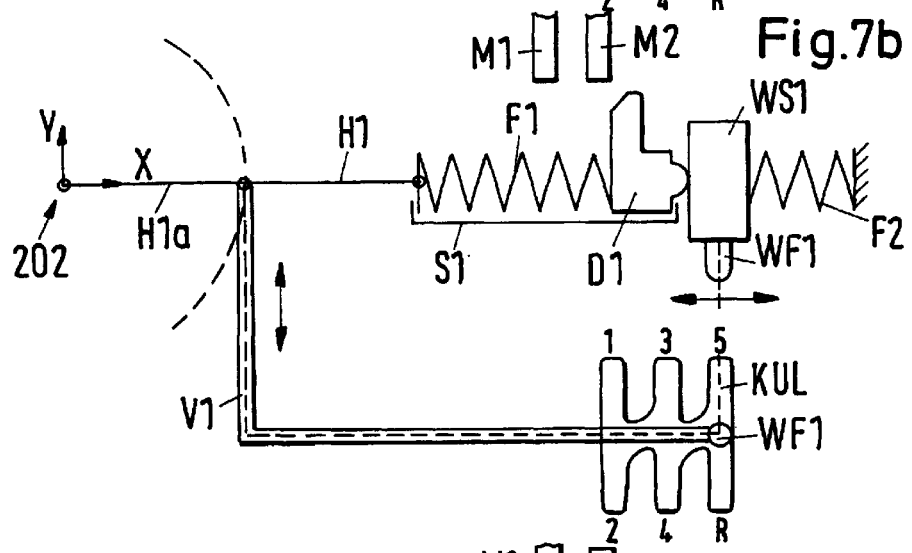
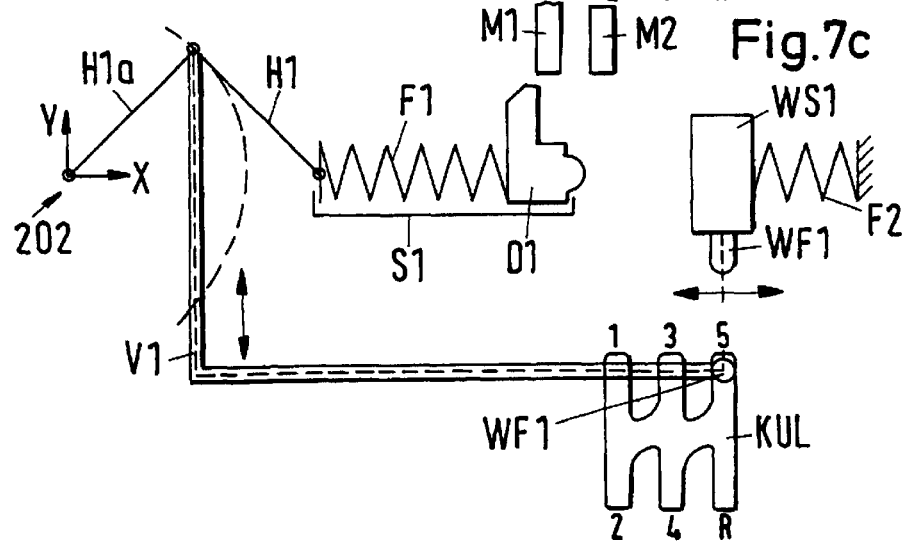

GEARBOX

BACKGROUND OF THE INVENTION

The invention relates to a gearbox with an operating device for automatic shifting and selection of a gear ratio, the gearbox having a gearbox operating element which is arranged to adjust the gear ratio and can be activated by means of an operating actor.

Such gearboxes are known, for example, from published German patent application Serial No. 196 37 001 in which a hydraulic drive is used for each activation of the shift and for each selection process. The use of two drives to control the shift and selection process is complex in construction and assembly with regard to the drive.

OBJECT OF THE INVENTION

An object of the invention is to provide a gearbox of the above outlined type with an operating device for automated shifting and selection of a gear ratio which has a simpler construction than gearboxes with devices according to the state of the art. Another object is to reduce the number of parts.

SUMMARY OF THE INVENTION

This is achieved according to the invention in that the operating actor has a drive with a drive output element where, on an angular movement of the drive output element, the gearbox operating element carries out a movement to engage a gear ratio or select a shift slot and, at the same time, acts upon an energy storing device which activates an intermediate element for activation of the gearbox operating element for selection or shifting, the activation of the intermediate element being limited to a predetermined position by means of at least one retaining element.

Here, it is advantageous if the gearbox operating element is a central shifting shaft by means of which, on axial displacement of the shifting shaft, an engagement of a gear ratio can be carried out and, on rotation of the shifting shaft, selection of a shift slot can be carried out.

It is suitable if the gearbox operating element is a central shifting shaft by means of which, on turning of the shifting shaft, an engagement of a gear ratio can be carried out and, on axial displacement, selection of a shift slot can be effected.

It is also suitable if, between the drive output element and the gearbox operating element, there is a form-locking connection in the axial direction or in the circumferential direction of a rotary movement.

According to a further inventive concept, it is advantageous to provide between the intermediate element and the gearbox operating element a selector element which can be force-impacted by the intermediate element, and to provide between the selector element and the gearbox operating element a force-locking connection acting in the axial direction or in the circumferential direction of a rotary movement.

It is suitable if the gearbox operating element can be activated, e.g., rotated, by means of the intermediate element against the force of an energy storing device.

It is also advantageous if the energy storing device is linked to the selector element at one force application point and is fixedly secured to the housing at another force application point.

It is also advantageous if at least one retaining element has a bolt displaceable or lockable by means of a magnet or an electric motor.

It is also suitable if, in at least one of its adjustable positions, the bolt limits or blocks a turning of the intermediate element.

BRIEF DESCRIPTION OF THE DRAWINGS

The invention will be explained, by way of example, with reference to the Figures. There are shown in:

FIGS. 3*a* to 9*c* diagrammatic views of a device according to the invention.

DETAILED DESCRIPTION OF PREFERRED EMBODIMENTS

Figure 1:
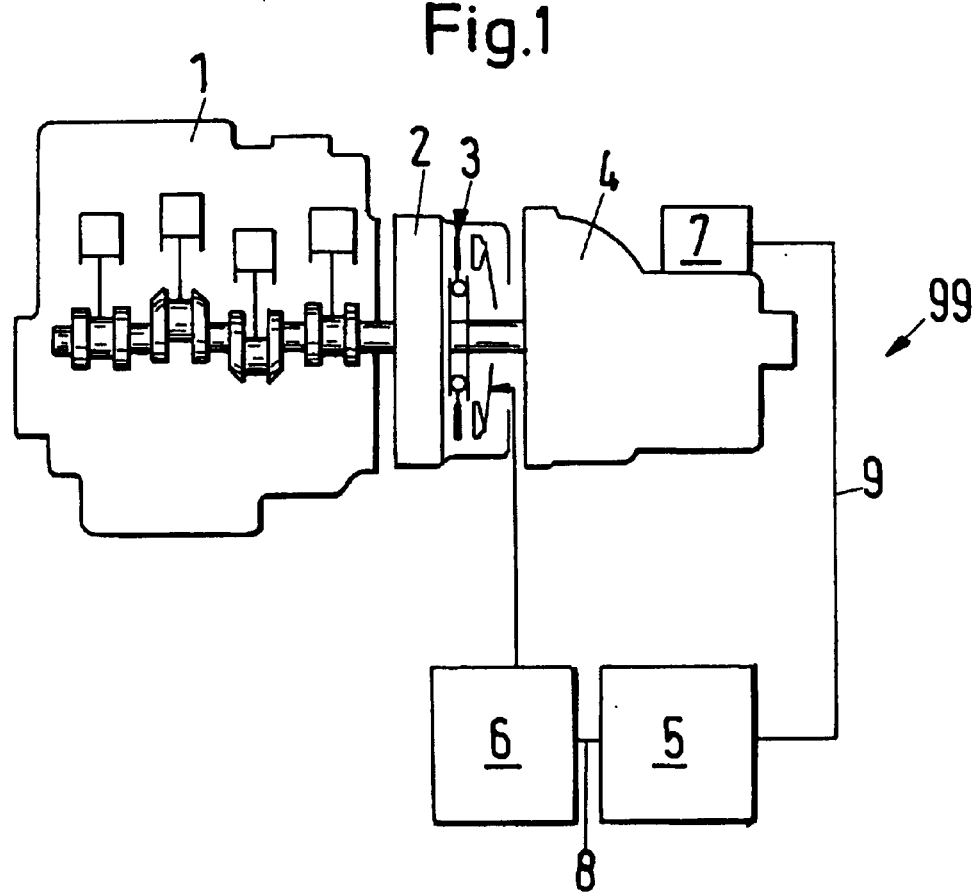
FIG. 1 a diagrammatic view of a power train.

FIG. 1 shows diagrammatically a fuel combustion machine 1, such as a combustion engine, after which is connected a flywheel 2 and a torque transmission system 3, such as a clutch, and a gearbox 4. Via the gearbox output shaft and for example a differential connected after this, drive wheels for example of a motor vehicle can be driven.

The gearbox 4 has an operating device 99 for automated shifting into and selection of a gear ratio of the gearbox 4.

A control unit 5 controls an operating actor 6 for the activation of the torque transmission system 3 such as a clutch. The control unit 5 can also control at least one device with an operating actor 7 for shifting and/or selection of the gear ratio of the gearbox 4. The control unit 5 is in signal transmitting connection with the actor 6 via the signal connection 8 and with the operating actor 7 via signal connection 9. The control unit 5 can also be in signal transmitting connection with further electronic units such as for example engine electronics. Also, the control unit can be in signal transmitting connection with sensors.

Figure 1A:
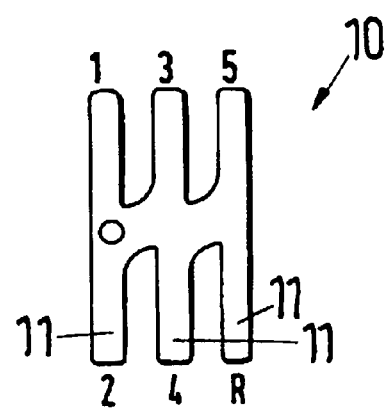
FIG. 1*a* a shift gate.

As used herein, shifting and/or selection of the gear ratio denotes that, on a selection process, a selection is made between shift slots 11 of a shift diagram 10 of the gearbox and, on the shift process within a shift slot 11, a gear or gear ratio is engaged or disengaged, see FIG. 1*a*.

The gearbox 4 has at least one activatable gearbox operating element internal to the gearbox or projecting from the gearbox such as for example a central shifting shaft or at least individual shifting rods by means of which the gear ratio of the gearbox can be set or activated by a shift and/or selection process. On activation, the gear ratio of the gearbox is thus controllable in a planned manner by means of at least one operating actor.

There are various embodiments of gearboxes where individual gears are shifted by rotating a central shifting shaft and where the shift slots are selected by moving the central shifting shaft in an axial direction.

There are also design forms of gearboxes in which the shift and selection control take place via a central shifting shaft, where the actuation for shifting is converted to an axial movement of the central shifting shaft and the activation for selection is converted into a rotational movement of the central shifting shaft.

There are also gearboxes which have two or more axially displaceable or rotatable elements for shifting and selection of the gear ratio.

The actuating device 99 has an operating actor 100 which has a drive 101, such as for example an electric motor followed, where applicable, by a gearing. The drive has a drive output element 102 which can be turned on control of the drive such as the electric motor. Arranged on or formed of one piece with this drive output element 102 are two pegs 103 and 104 which are also turned on rotation of the element 102.

To shift and/or select the gear ratio of the gearbox 4, the drive output element 102 is turned from the central position or from one of the end positions, either clockwise or counterclockwise, through an angle $\alpha_1$.

A selection process from the neutral position of the gearbox into the position or location of the first gear takes place from the median position of the drive output element 102 in a clockwise direction and into the one end position. A selection process from the neutral position into the position or location of the second gear takes place from the central position of the drive output element 102 counterclockwise into the corresponding other end position. Shift and selection processes are carried out correspondingly.

On pivotal movement of the peg 103 in the course of a shift and/or selection process, such pivotal movement of the peg is transformed or translated by means of a transfer gate 105 into an axial movement of the central shifting shaft 106. By such axial movement of the central shifting shaft 106, the shift process of the gear ratio of the gear is carried out. For additional clarity, the indicator element 107 and the shift gate 108 are shown where the central shifting shaft 106 can be displaced axially and turned in such a way that all gear or translation stages of the gearbox (gears 1–6, reverse R and neutral N) can be engaged. The axial movement of the central shifting shaft initiates the engagement and disengagement of the gear ratios. The illustrated positions of the peg 103 and of the shaft 106 correspond to the neutral position of the gearbox in the shift slot of the first and second gears. The first gear is selected in response to a clockwise angular movement through an angle $\alpha_1$, and the second gear is selected in response to a counterclockwise rotary movement. Another gear is selected analogously if the slot is different.

The transfer gate 105 has two spaced-apart essentially parallel flanks 105a, 105b between which the peg 103 is tightly engaged in the axial direction of the shaft 106, and the shaft 106 is axially displaced on pivoting of the peg 103.

Starting from an engaged gear, on an angular movement of the drive output element 102 in the direction toward the neutral position, such as the median position of the drive output element 102, the pivotable element 111 is pivoted via a link rod 110. Both end portions of the link rod 110 have link sockets 110a, 110b which are articulately connected with the link heads 104a, 112a on the pegs 104 and 112, respectively. The pivotable element 111 is rotatably mounted on a projection or shaft 121 of an intermediate element 120.

Between the element 111 and the intermediate element 120, there is provided an energy storing device 140, such as a spring or coil spring which, on a relative angular movement between the elements 111 and 120, is forcibly compressed and stores energy. The two end portions 140a and 140b of the spring 140 are fixedly secured to the elements 111 and 120 by retaining pegs 141 and 142, respectively.

In the event when there is no restriction upon angular movement of the element 120, the element 120 would follow the rotary movement of the element 111 on a shift from a gear position into neutral or vice versa. However, if rotation of the element 120 is limited, the energy storing device 140, such as the aforementioned spring, is caused to store energy.

Figure 2:
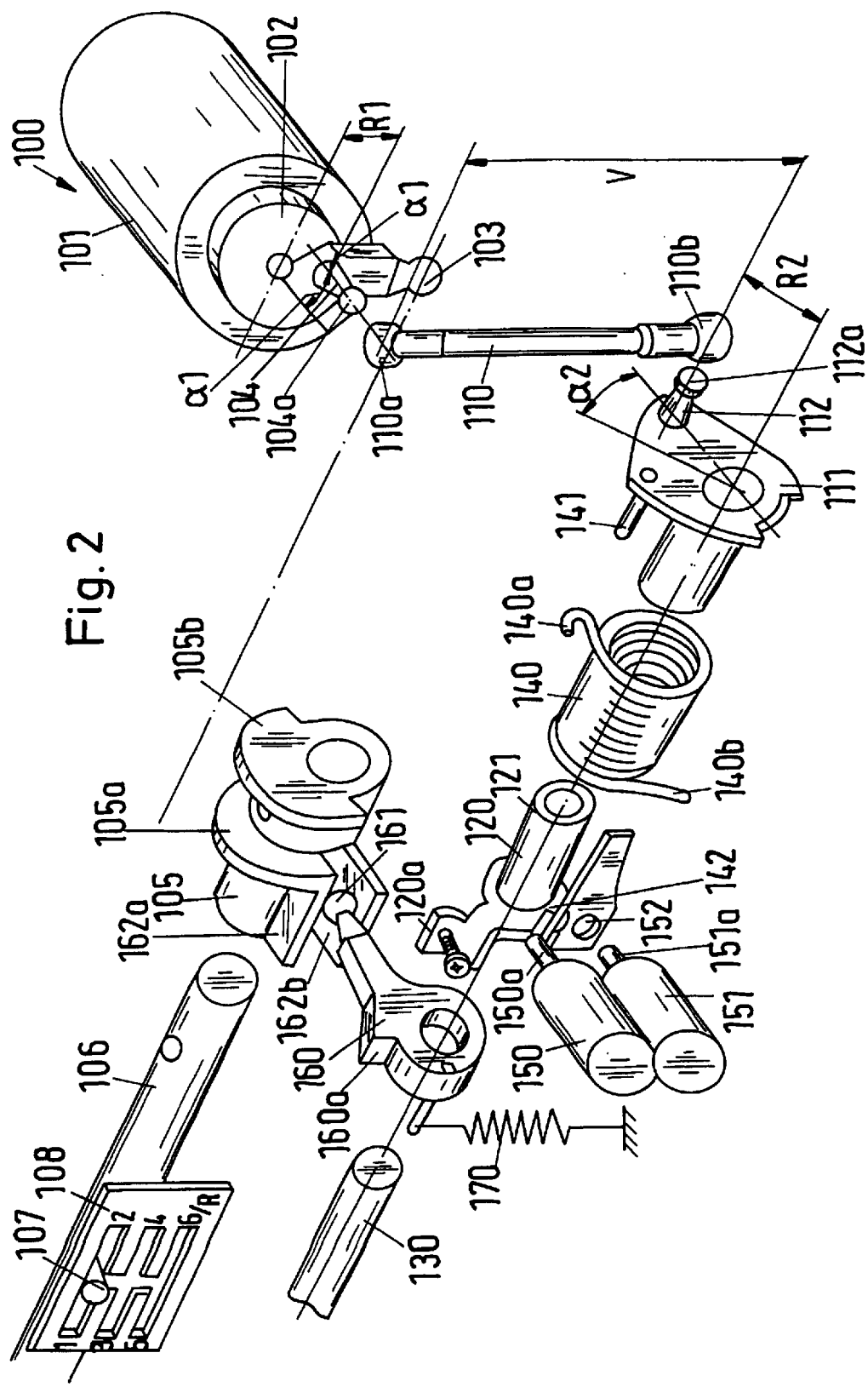
FIG. 2 an operating device according to the invention.

To restrict or limit the rotation of the element 120, at least one retaining element 150, 151 is provided which can restrict rotation of the element 120 in a planned manner. This at least one retaining element, or as shown in FIG. 2, two retaining elements 150, 151 have pins or bolts adjustable in position which can be set between individual positions. Here, the retaining element 151 is structured in such a way that it has a bolt 151a which can enter an opening 152 of the element 120. Due to such engagement of the bolt 151a, the element 120 cannot be rotated by the force impact. Thus, engagement establishes protection against rotation.

By activating the retaining element 150 and on outward movement of the bolt 151a, rotation of the element 120 can be limited to the slot of the third and fourth forward gears. If thus the energy storing device 140 is moved by the shift process into the neutral position the element 120, through the energy storing device 140, such as a torsion spring, is turned to assume a position corresponding to the slot of the gears three and four. If neither the retaining element 150 nor the retaining element 151 is activated, on a shift process into neutral position the energy storing device is caused to store energy or to store additional energy and the element 120, owing to the bias of the energy storing device 140, such as a torsion spring, is turned to assume the position corresponding to the slot of the gears five and six or to the slot for R.

The element 120 has a supporting surface 120a which can be urged against a complementary surface 160a of a selector lever 160, as a selection element, by means of an energy storing device 170. By turning the element 120, the selector lever 160 is pivoted against the force of the energy storing device, such as a spring, and a process involving selection of shift slots can be carried out. Here, a head 161 of the selector lever 160 enters between two jaws 162a, 162b of the transfer gate where, on pivoting of the selector lever 160, the transfer gate is turned and thus the central gear shaft 106 is turned.

On movement of the transfer gate 105 and the central shifting shaft 106 in the direction toward neutral position, via the connecting rod 110 at the same time the energy storing device 140 of a pretension mechanism 120, 140, 111 is impacted and tensioned. While the element 111 carries out a rotary movement, the stop element 120 is held via selector lever 160, central shifting shaft 106 and H-shift gate 108 so that the pretension spring (energy storing device) 140 is caused to store energy.

If the bolt 107 is freely movable in the neutral position of the gearing in the selection direction, the energy storing device 140 is permitted to dissipate energy and turns the central shifting shaft 106 against the resistance of a spring 170 into the slot of the gears three, four or five, six or R. Whether in the selection process, such as an angular movement of the central shifting shaft, only the next slot or a further slot is selected, depends upon which retaining element, namely the retaining element 150 or 151, is activated or operated.

In the further course of the gear change, the pretension mechanism 120, 140, 111 is returned or rotated back to its starting position via link rod 110 with a gear engaged. Thus, the surface 120a of the element 120 is lifted off the surface 160a of the selector lever 160, where the selector element is however fixed in such position by the shift gate 108 and can no longer turn back.

A return movement from a higher slot (e.g., for the gears three and four) takes place via the energy storing device 170, such as a resetting spring. Here, too, the retaining elements 150, 151 limit by their activation the return to the required slot of the gearbox. The energy storing device 170 has in both end areas force application points which are firstly connected with a retaining web of the element 160 and secondly fixedly connected to the housing.

On a shift of the gears within a shift slot, such as for example from the first to the second gear, the retaining element 151 is activated to allow only activation in the shift slots of the gears one and two. On a shift process into the slot of the gears three and four, for example, from the gear three into the gear four, the movement of the stop element 120 is limited by the retaining element 150.

In such cases of shift processes, the energy stored in the energy storing device is dissipated again on engagement of a gear.

The retaining elements can constitute blocking magnets with a bolt displaceable by means of a magnetic field. The retaining elements can also constitute step magnets, where it is suitable, instead of two magnets, to provide one step magnet in which the bolt can be adjusted to a plurality of positions.

Similarly, the retaining elements can constitute electric motors with for example bolts formed as spindles, where on rotation of the motor shaft these spindles can be screwed axially out or in.

FIGS. 3a to 9c show a device according to the invention and a process according to the invention utilizing that device according to the invention in which two functions are described, namely shifting of a gear within a shift slot and selection of a gear slot of the gearbox.

Here a continuous function (main function) such as shifting or selection is carried out directly by the drive of the operating actor. An independent second function (auxiliary function) such as selecting or shifting uses separate positions.

At the time of progress of the auxiliary function, this draws its energy from the drive of the main function but from an energy or force storing device such as a spring.

The energy for the carrying out of the auxiliary function is advantageously taken in a not time-critical phase from the drive of the main function and stored temporarily in an energy storing device. When the auxiliary function is to be carried out, energy is drawn from such energy storing device.

The energy storing device always dissipates only as much energy as is required to cover a distance until reaching the desired discrete position of an element for selection or shifting If originally more energy was stored than the energy required, the excess energy is returned to the source, which means that the energy is again available for the selection movement.

The energy performance of the auxiliary function and/or tensioning or impacting of the energy storing device is drawn from the drive for the main function. Optionally, however, the energy can be drawn from another source.

Thus, an operating actor for two functions can be produced with just one drive without the disadvantages of the known fixed angular relations of the functions.

The device proposes stops which define individual discrete positions which can be assumed by the position-modifiable element 120. These stops can constitute mobile stops in accordance with an advantageous embodiment.

The number of discrete positions can match the number of selectable positions, and the number of stops can conform to such number. The number of positions determines the number of stops or, in the case of a combining of stops, a smaller number.

For example, the target position on a change of shift slot in a selection process is defined by means of the position of stops. The rest position for the stops can be at the top or at the bottom.

If multi-stage stops are used, corresponding stepped operating elements can be used to reduce the number of operating elements.

For example, the following can be considered as operating elements for the steps: a multi-stage adjustable magnet for a multi-stage stop, switch magnets, an electric motor for example with a pin which can be extended by means of a thread on rotation of the motor shaft and moves via any drive a device formed as a stop for the slots concerned, or a pneumatic or hydraulic control. Combinations of the components listed above are also possible.

The link between the main function drive and the energy storing device can contain step-down or step-up gear stages. However, the directions of movement are free.

The design example employs an operating actor for automation of a manual gearbox with three shift slots (1-2, 3-4, 5-R) but gears with more than three shift slots can be operated in an analogous manner.

The functions of shifting (movement forward/backward in a shift slot) and selection (selection movement right/left between shift slots) are each independent of the direction of the other function. There is no direction dependency of the main function of shifting.

If shifting and selecting were in opposite directions, the actor could still be used.

Figure 3A:
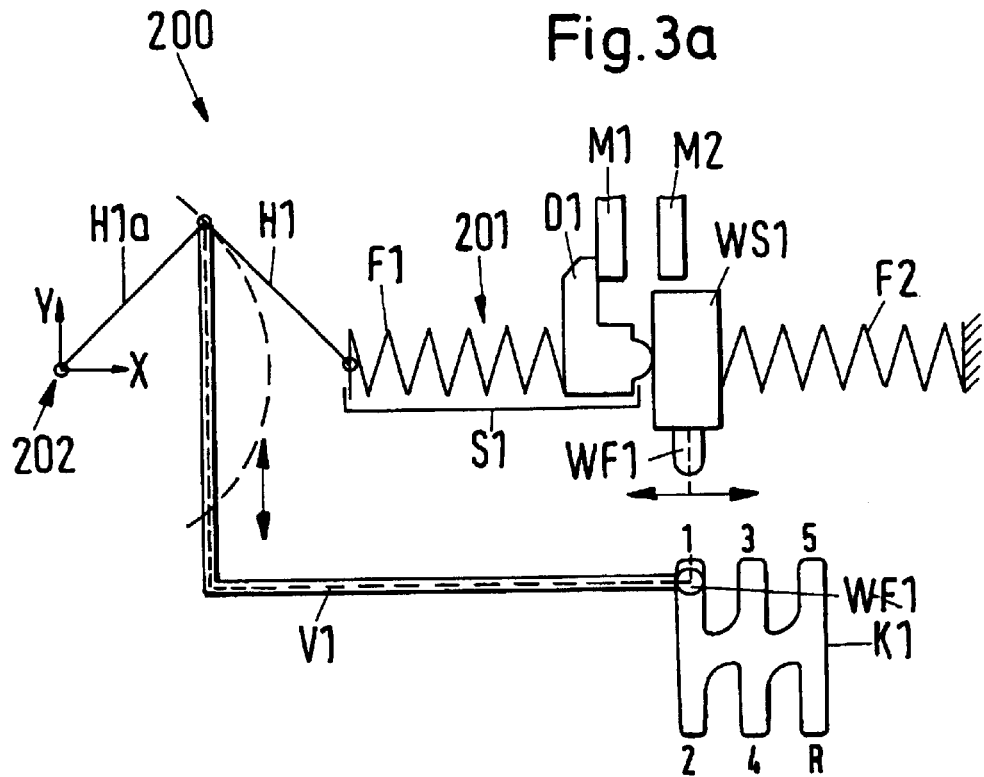
Figure 3B:
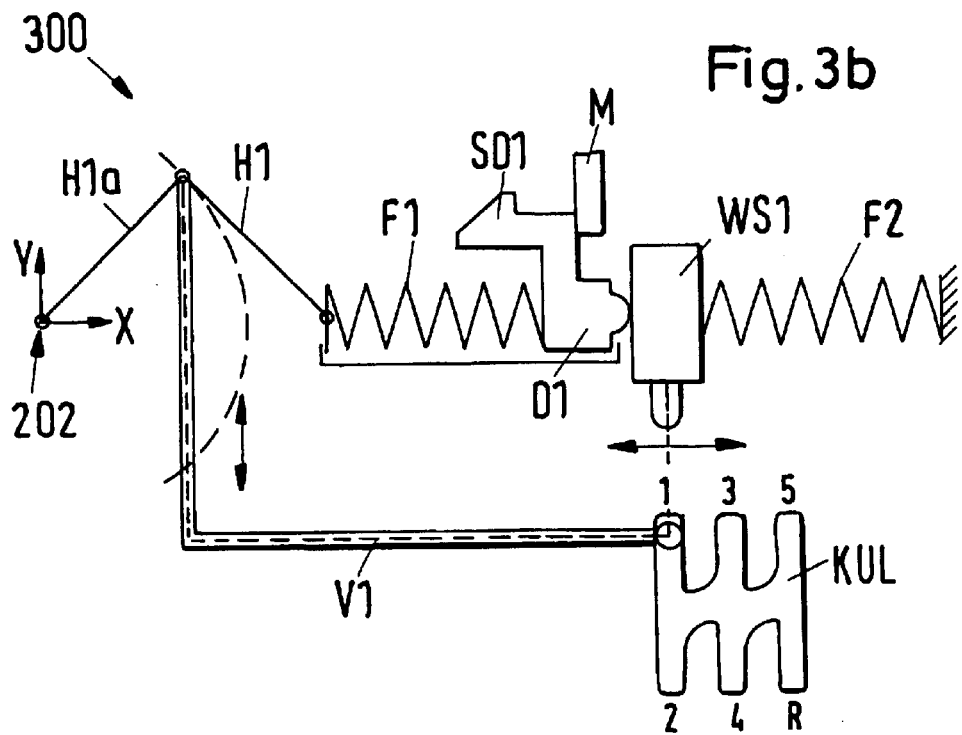

FIGS. 3a and 3b show schematically two advantageous embodiments of devices 200 and 300.

Among others, the device 200 of FIG. 3a has two actuatable stop pins M1, M2 of the aforedescribed type which determine the end position of the element 120 during selection.

Furthermore, there is provided a mobile energy storing device 201 which comprises a prestressed energy storing spring F1 serving as a force accumulator and being tensioned and relaxed by a lever mechanism H1. On the other hand, the drive 202 for the lever mechanism, by turning of H1a and H1 and displacement of the element WF1 for shifting, such as for example a central shifting shaft, fulfills its main purpose of operating a central shifting shaft for the shift movement. This spring 201 reacts against a thrust pad D1 which has an abutment for the spring on the side of the lever mechanism and thus guarantees a basic initial stressing within the energy storing device. The initial stressing is effected by a schematically indicated clamp S1.

The return spring F2 is firmly connected with the central shifting shaft WS1, the guide bolts WF1 of which can be seen projected in the gate (K1).

The pins of the stop bolts M1 and M2 limit the position or movement of D1 and allow the stop of D1 to pass only when the corresponding operating element assumes its one or upper rest position.

In the device of the embodiment of FIG. 3b, only one position-modifiable drive-activatable stop pin M is provided; this stop pin can be shifted or actuated in 2 stages, i.e., to three positions. These stages correspond to the abutments or stops of the stepped thrust pad SD1. This device can perform the same functions, such as shifting and/or selecting, as the device of FIG. 3a.

The rest position of the energy storing device is advantageously in the shift slot with gears 1-2 whereas, in accordance with another advantageous embodiment, the rest position can also be allocated to another shift slot such as for example the shift slot 5-R. The energy storing device, such as the spring F1, is pulled into this shift slot by the lever H1 when a gear in the gearbox is engaged, i.e., when the finger WG1 has reached an end position in a shift slot. The spring F1 is then under a basic or initial stress which is established in that the spring in the illustrated clamp S1 is arranged beneath the pressure pad D1 and the spring S1 under initial stress and cannot dissipate all of the energy.

In response to further increase of stressing of the energy storing device by a shortening of the path or the space for the energy storing device by the distance of a slot (loading or stressing of the energy storing device), the energy storing device can due to its prestressing and characteristic curve compress the spring F2 by at least the distance of a slot. In response to a shifting, such as prestressing, through a distance corresponding to two slots, the energy storing device can compress the spring F2 by at least the distance of two slots.

Figure 4A:
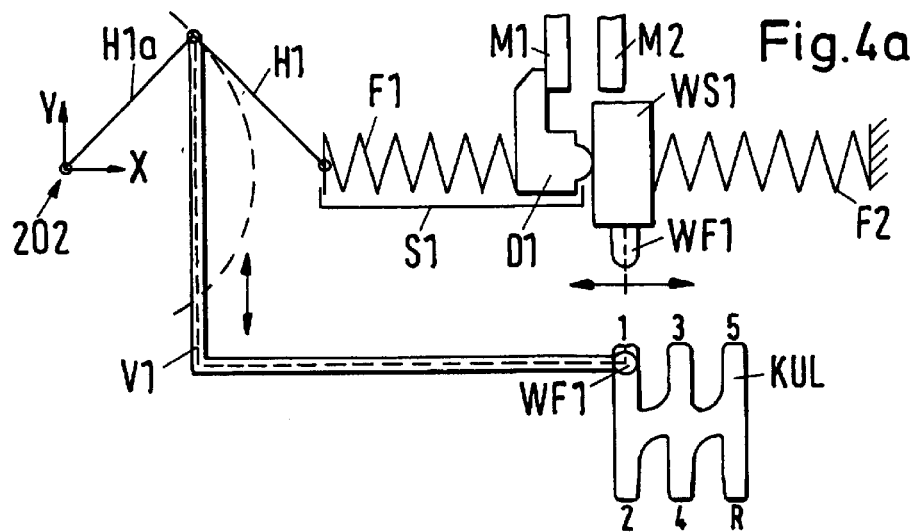
Figure 4B:
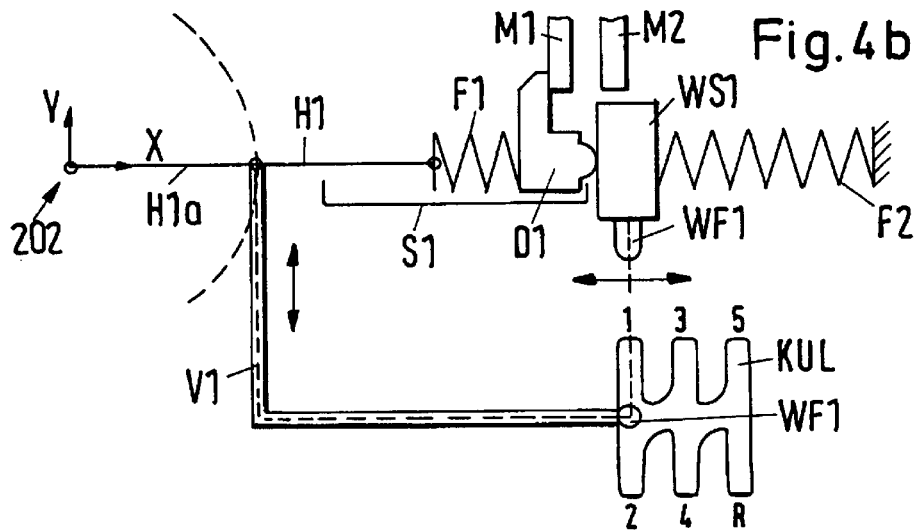
Figure 4C:
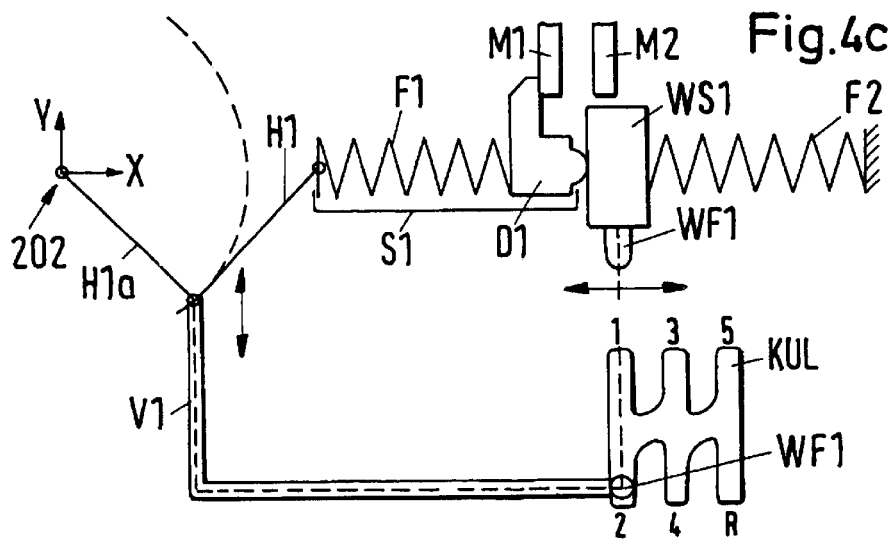

FIGS. 4a to 4c illustrate an automatic shifting procedure in a stepwise fashion by means of the device 200, there being carried out a shifting procedure from a gear 1 to a gear 2. This does not necessitate a change of the shift slot, i.e., a selection.

With the first gear engaged, the spring F1 is being subjected to a basic initial stress and both stops M1 and M2, or at least the one stop M1, are/is located in their/its lower rest positions or position. The thrust pad D1 contacts the first stop M1. Thus, the entire energy storing device is held against movement. Apart from the initial stressing, essentially no additional energy is stored in the energy storing device.

Upon disengagement of the gear 1, i.e., on movement of the finger WF1 by pivoting the lever H1a and displacement of the linkage V1 coupled to the finger WF1, the spring F1 is stressed in response to movement of the lever mechanism H1. The tensioning distance corresponds in this embodiment essentially to the distance required to pass two slots where, without blocking by the stop M1 or M2 against the return force of the energy storing device, the selection process would have been carried out.

However, the thrust pad D1 cannot yield or become displaced because such movements are prevented by the stop M1. The return spring F2 holds the gear shaft WS1 in the slot 1 even if the K1, in its central plane, i.e., in the neutral range N of the gearbox, were to permit a movement out of the slot.

On further shifting from neutral into the gear 2, see FIG. 4c, F1 is again permitted to relax and essentially returns the stored energy to the lever H. Thus, such energy can be utilized to support the main function of the drive for the lever H1.

FIGS. 5a to 5c represent an automatic shift process by means of the device 200 in stages to carry out a shifting process from gear 2 into gear 3. In neutral position N, there always takes place a change of shift slot, i.e., a selection by one slot in a direction toward 5/R.

Prior to starting a disengagement of the gear 2 by turning the lever H1a, H1 by the drive, the pin of the stop M1 is moved to the upper rest position but the pin of the stop M2 remains in its lower rest position. Since M2 is in the lower rest position, D1 can move only until it contacts the stop M2. On disengagement of the second gear, F1 is stressed to an extent corresponding to the distance or spacing between two slots. Before the neutral position N is reached, the gate KUL still holds the guide bolt WF1 in the shift slot 1-2. When the gate KUL is in the neutral range N and allows a change of shift slot, or selection, D1 is pushed in response to partial dissipation of energy by the spring F1, which reacts against H1, upon the stop M2 which corresponds to the position of the finger WF1 in the required slot 3–4. Here, F2 is acted upon and is at least partially compressed. On further engagement of the gear 3, F1 dissipates half or part of stored energy again because the prestressing was caused merely by further movement through a distance of two slots but the actual distance was limited by the stop M2 to that of only one slot. The force being then applied by the return spring F2 is absorbed for example, by the gate.

Figure 6A:
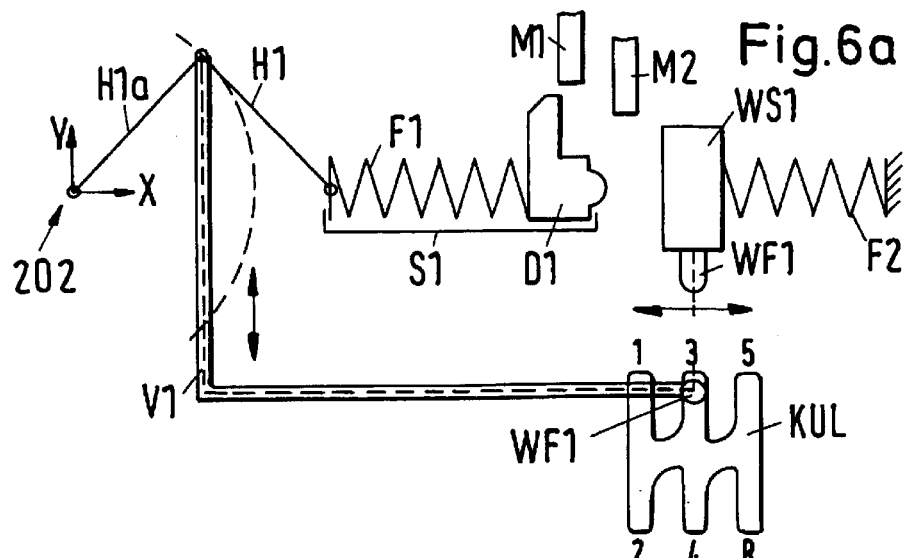
Figure 6B:
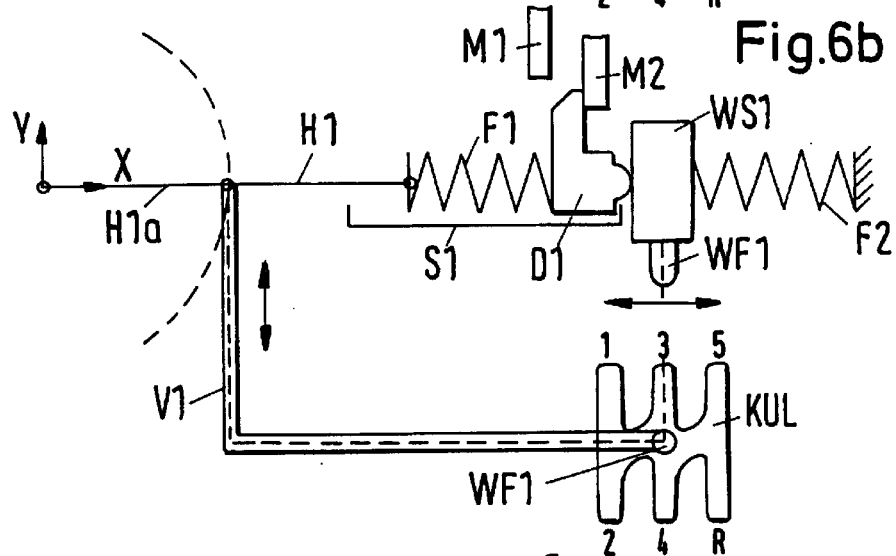
Figure 6C:
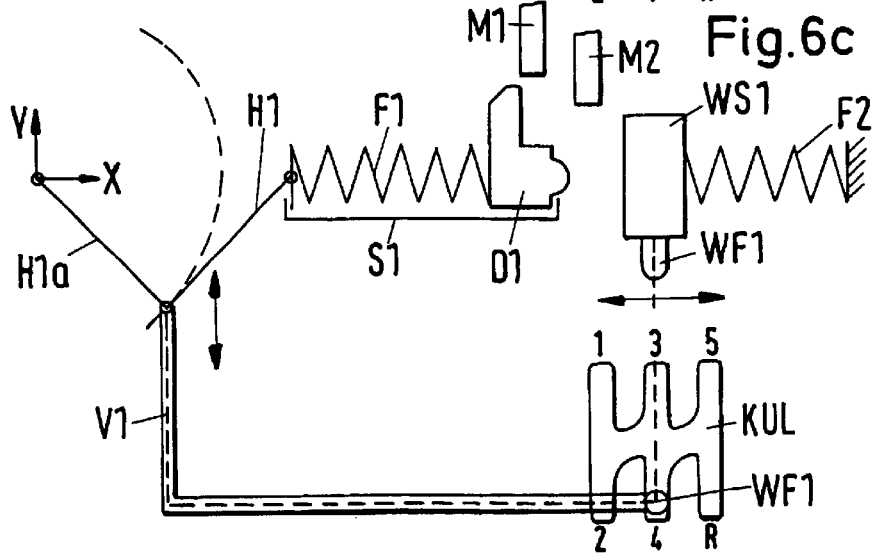

FIGS. 6a to 6c represent an automated shift process by means of the device 200 in stages to carry out a shift process from the gear 3 into the gear 4. No change of shift slot, i.e., selection, is necessary. Stops M1, M2 are positioned as for gear change 2=>3 (M1 top, M2 bottom). The energy storing device F1 is moved to the right by the distance of one slot because H1 is pressed against F1 and the entire energy storing device can yield as far as stop D1 on M2. If D1 now lies against M2, further movement of the lever H1 leads to a stressing of the energy storing device by the distance of one slot (the energy storing device is moved fully by the lever H1 through the distance of the first slot). As now F2 biases the gear shaft WS1 against the thrust pad D1, the slot does not change during the shift process even if the gate allows a selection. As the energy storing device F1 did not have to give off energy for selection, in this case it dissipates the stored energy in an amount corresponding to the distance for one slot.

FIGS. 7a to 7c illustrate an automatic selection process by means of the device 200 in stages to carry out a shift process from the gear 4 into the gear 5. Here, in the neutral position N, there is a change of shift slot, i.e., a selection by one slot in the direction 5/R. To reach the shift slot 5/R, M1 and M2 are activated in the upper rest position. F1 is tensioned during disengagement of the gear 4. The complete energy storing device is moved from the slot 1/2 to the slot 3/4 where it bears upon the shifting shaft WA1 with the thrust pad D1. The position of WS1 is now maintained by the gate. During its further movement, the lever H1 only stresses the energy storing device, which is no longer displaceable, by the distance of one slot (one slot displacement distance, one slot load). When the gate now allows a selection, F1 dissipates energy and presses D1 against WS1 and further toward the right-hand selection stop of the gate whereby F2 is caused to store energy. Thus, the energy storing device has given off all energy down to its basic initial stress. During engagement of the gear, it is drawn into the rest position of gears 1/2. The force of F2 is absorbed by the gate.

Figure 8A:
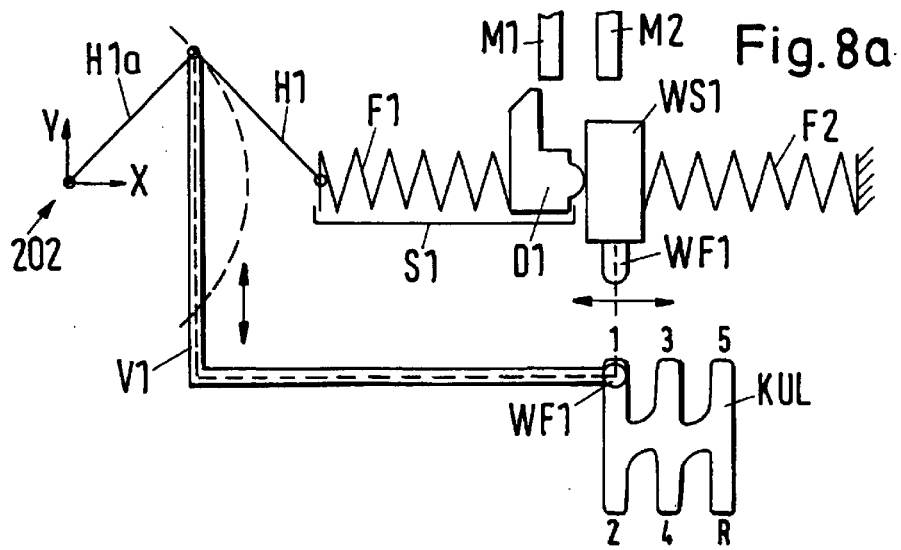
Figure 8B:
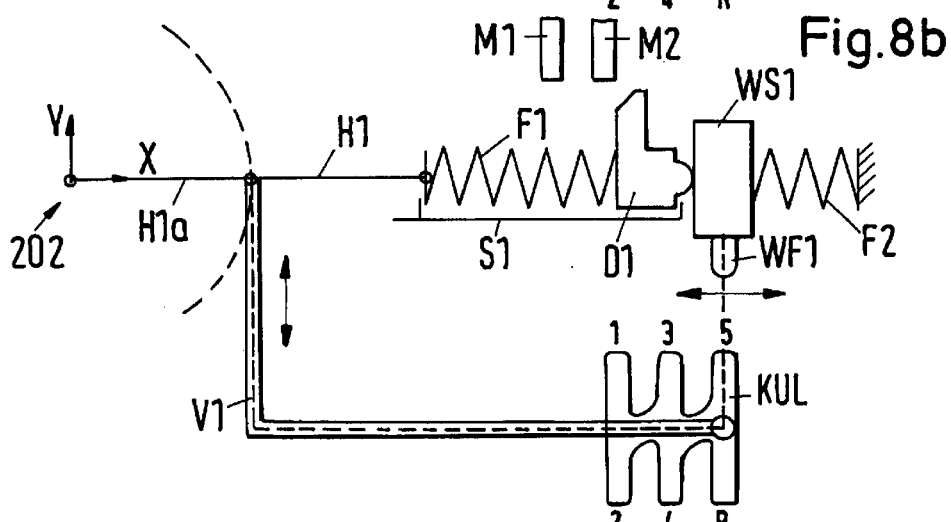
Figure 8C:
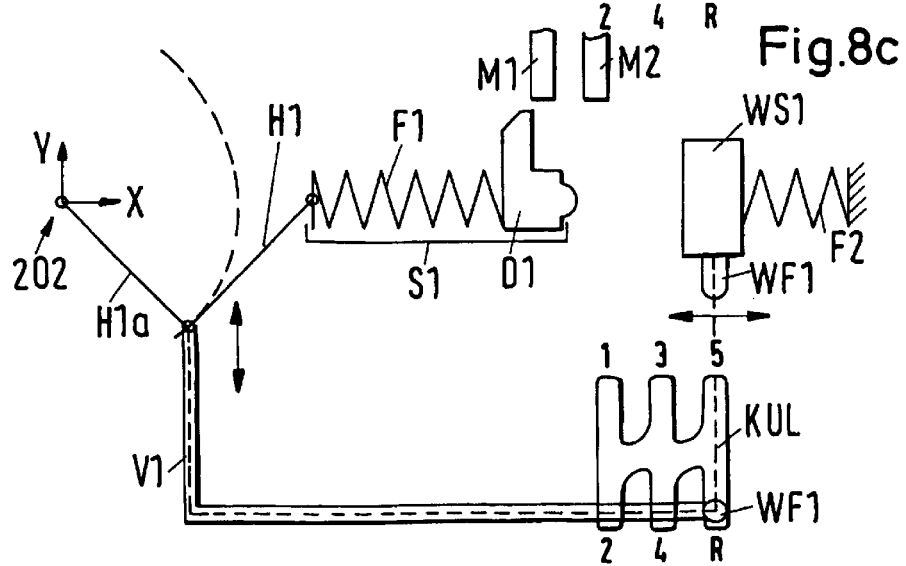

FIGS. 8a to 8c represent an automatic shift process by means of the device 200 in a stepwise fashion to carry out a shifting from the gear 1 into the gear R, i.e., into reverse gear. Here, in the neutral position N, there is a change of shift slot, i.e., a selection by two slots in the direction toward 5/R. To reach the slot 5/R starting from the slot 1/2, the two stops M1 and M2 are brought to their upper rest positions. Thus, the entire distance is cleared for D1. Upon disengagement of the gear 1, F1 is stressed by the amount of two slot widths and WS1 with its stop in the gate prevents a movement over the contact point at D1. When the gate now permits a selection, F1 dissipates energy and pushes D1, and hence WS1, into the gate 5/R. The gear can then be engaged but energy cannot be recovered from F1 because a selection over two slots has occurred. The bias of F2 is taken up by the gate.

Figure 9A:
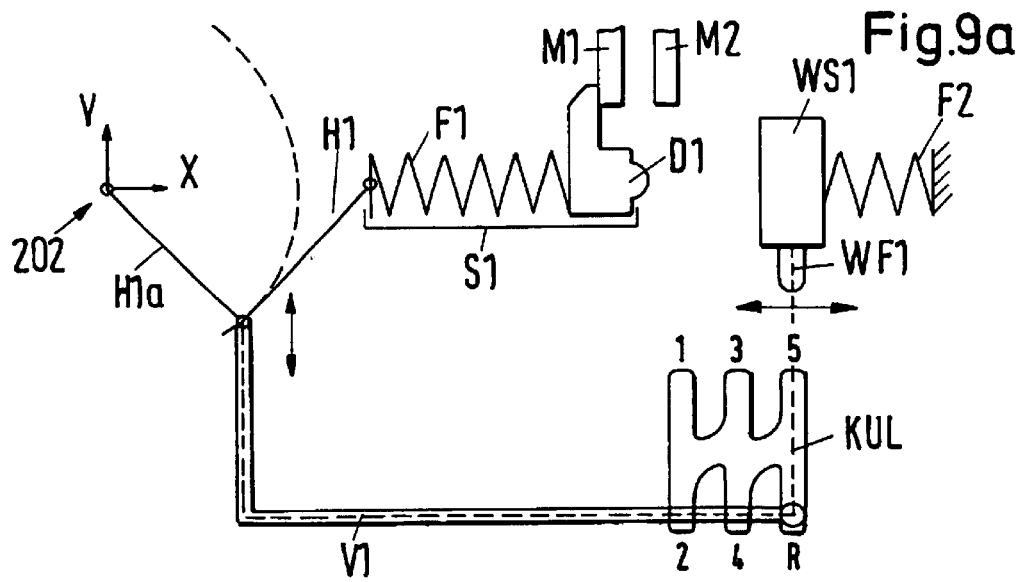
Figure 9B:
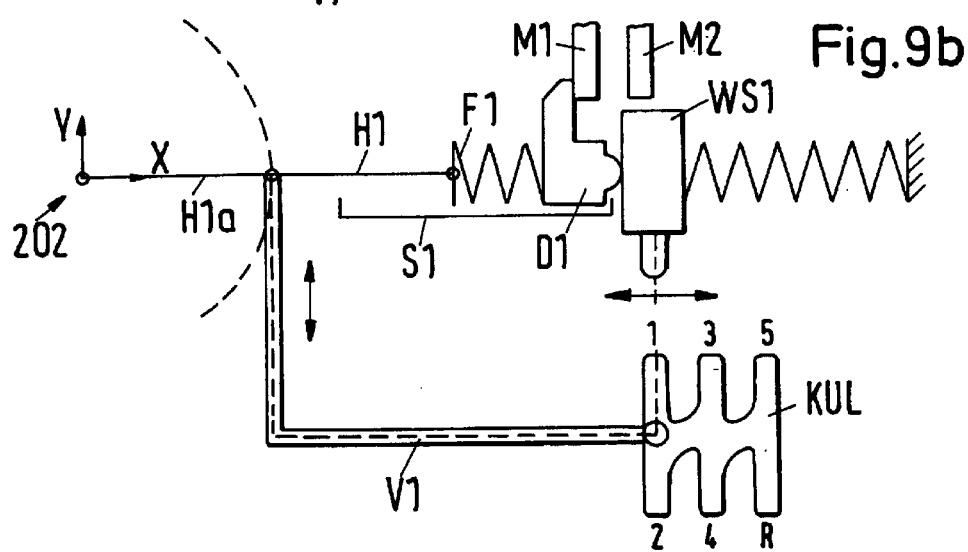
Figure 9C:
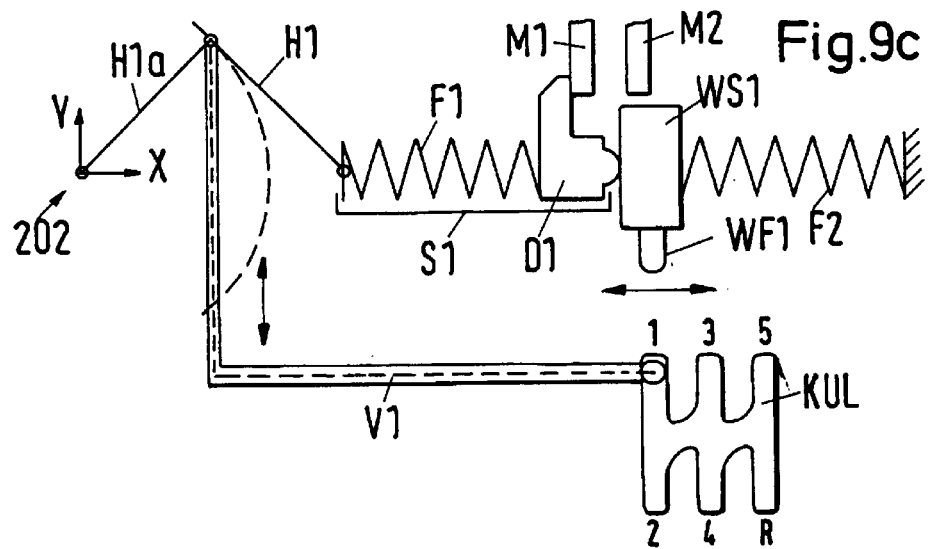

FIGS. 9a to 9c illustrate the steps or stages of an automated shift process by means of the device 200 to carry out, in stages, a shift process from the gear R, i.e., from reverse, into the gear 1. In the neutral position N, a change of the shift slot (i.e., a selection) takes place by a distance of two slots and in the direction of the slot 1/2. M1 and M2 remain in their lower rest positions so that D1 must remain in its original position. Upon disengagement of the gear, F1 is caused to store energy but D1 cannot move because it rests against M1. When the gate permits a selection, WS1 is pushed into the slot 1/2 in response to energy release by F2. F1 can relax upon engagement of the gear 1 so that the energy which was stored by F1 is recovered for the gear engagement.

All return shifts, such as for example, the shift 2-1, 3-2, 4-3 or 5-4, are carried out in the same way as described above for the return shift R-1, where the setting of the stops to define the return shift must be controlled. The target slot is always defined first via the position of M1 and M2, and is then set via spring force. However, here D1 always remains the stop for the shifting shaft WS1 which is always pushed to the left by the spring F2 on shifting down. As explained in the examples, for shifting up the energy storing device (spring F1) supplies energy for selection.

The control distance which is necessary to stress the energy storing device 140, i.e., the shift distance (by an appropriate selection of the ratio and components), is preferably less than the shift distance from the neutral plane to the synchronization point of the gearbox.

The patent claims which are filed with the application are proposed formulations without prejudice for the achievement of additional patent protection. The applicant reserves the right to claim further features heretofore disclosed only in the specification and/or in the drawings.

The back-references utilized in the dependent claims refer to the further developments of the objects of the independent claims by the features of the respective dependent claim; they are not to be regarded as a waiver of the achievement of independent substantive protection for the features of the dependent claims concerned.

Moreover, the features of the dependent claims constitute independent inventions which have a status independent of those of the preceding dependent claims.

The invention is not limited to the described examples. On the contrary, numerous changes and modifications can be carried out within the framework of the invention, particularly such changes, elements and/or combinations and/or materials which are novel, for example, by combination with or deviation from features or elements or process steps described individually in connection with those to be gleaned from the general description, drawings and claims and lead by combinable features to new objects or new process steps or process step sequences, also where they concern production, testing and operational features.

What is claimed is:

1. A gearbox with only a single actuating device for automated shifting and selection of a gear ratio, the gearbox having a gearbox operating element which is arranged to set the gear ratio and can be activated by means of a single operating actor, the operating actor having a drive with a drive output element which, in response to a swivel movement of the drive output element, carries out a movement to engage a gear ratio or select a shift slot and at the same time acts upon a rotary force accumulator that is placed into a rotary pretension state and which activates an intermediate element to operate the gearbox operating element for selection or shifting, the activation of the intermediate element being limited to a predetermined position by means of at least one retaining element.

2. The gearbox according to claim 1, wherein the gearbox operating element is a central shifting shaft, by means of which on axial displacement of the shifting shaft, engagement of a gear ratio and, on rotation of the shifting shaft, selection of a shift slot can be carried out.

3. The gearbox according to claim 1, wherein the gearbox operating element is a central shifting shaft by means of which, on rotation of the shifting shaft, shifting into a gear ratio and, on axial displacement, selection of a shift slot can be carried out.

4. The gearbox according to claim 1, comprising a form-locking connection between the drive output element and the gearbox operating element effective in one of the axial direction and the circumferential direction of a rotary movement.

5. The gearbox according to claim 1, comprising a selector element between the intermediate element and the gearbox operating element, wherein the selector element can be acted upon by a force furnished by the intermediate element, and further comprising a form-locking connection between the selector element and the gearbox operating element, wherein the form-locking connection acts in one of the axial direction and the circumferential direction of a rotary movement.

6. The gearbox according to claim 5, wherein the gearbox operating element can be moved by means of the intermediate element against the force furnished by an energy storing device.

7. The gearbox according to claim 6, wherein the energy storing device is linked to the selector element at one force application point and is fixedly linked to a housing at another force application point.

8. The gearbox according to claim 1, wherein the at least one retaining element comprises a bolt which can be displaced and fixed by one of a magnet and an electric motor.

9. The gearbox according to claim 8, wherein the bolt blocks rotation of the intermediate element in at least one of its selectable positions.

10. A gearbox with only a single actuating device for automated shifting and selection of a gear ratio, the gearbox having a gearbox operating element which is arranged to set the gear ratio and can be activated by means of a single operating actor, the operating actor having a drive with a drive output element which, in response to a swivel movement of the drive output element, carries out a movement to engage a gear ratio or select a shift slot and at the same time causes a force accumulator to rotate and store energy and be place into a rotary pretension state, the force accumulator serving to activate an intermediate element to operate the gearbox operating element for selection or shifting, the activation of the intermediate element being limited to a predetermined position by means of at least one retaining element, wherein the shift movement results from rotatory energy storage and energy release actions of the force accumulator.

* * * * *